United States Patent Office 3,611,717
Patented Oct. 12, 1971

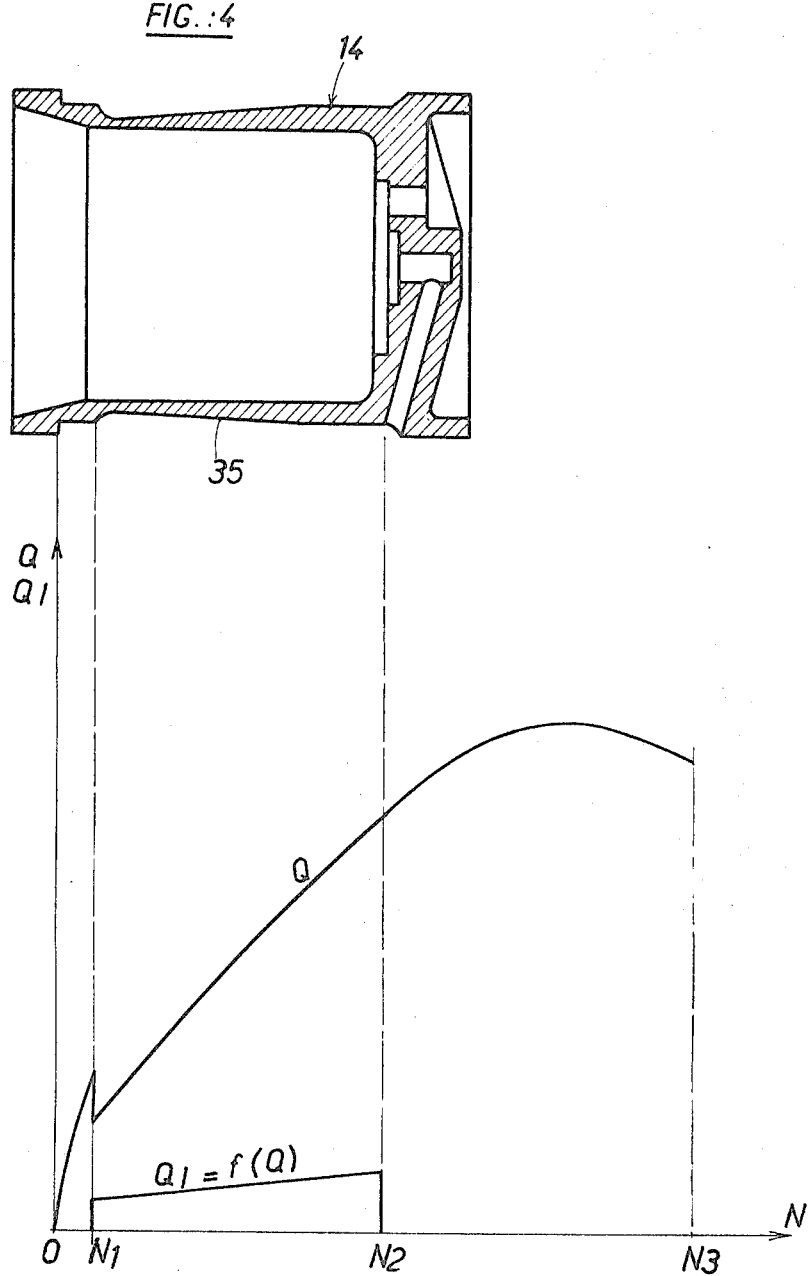

3,611,717
DEVICE FOR PROGRAMMING THE THROUGHPUT OF FUEL SUPPLIED TO A COMBUSTION CHAMBER DURING AN IGNITION OR RE-IGNITION PHASE
Roger Henri Tissier, Paris, France, assignor to Societe Nationale d'Etude et de Construction de Moteurs d'Aviation, Paris, France
Filed Apr. 23, 1970, Ser. No. 31,190
Claims priority, application France, Apr. 24, 1969, 6913035
Int. Cl. F02c 9/10
U.S. Cl. 60—39.28                        10 Claims

ABSTRACT OF THE DISCLOSURE

A device for programming the throughput of fuel supplied to a combustion chamber during an ignition or re-ignition phase, the said chamber being of the type in which at least two different fuel-injection systems open into the chamber, namely, a main injection system supplied through a main pipe by a continuously operating main pump, and at least one auxiliary injection system supplied at the time of ignition or re-ignition of the chamber by an auxiliary pump of the piston and cylinder type operating discontinuously and put into operation by the pressure of the fuel being fed to the main injection system, the said device comprising means to provide automatic adjustment of the throughput of fuel injected into the combustion chamber by the main injection system as a function of the relative positions of the piston and cylinder of the auxiliary pump.

---

This invention relates to a powerplant, more especially but not exclusively a gas turbine jet propulsion engine, which includes a combustion chamber into which there port or open two different fuel injection systems, i.e. a main injection system supplied through a main pipe by a continuously operating main pump, and at least one auxiliary injection system supplied, during an ignition or re-ignition phase of the chamber, by an auxiliary pump of the piston and cylinder type, operating discontinuously and put into operation by the pressure of the fuel supplied to the main injection system, and the invention more particularly has for its object to provide a device for programming the fuel throughput supplying the said chamber during the ignition or re-ignition phase.

The auxiliary injection system often has ports in the combustion chamber not in a direct manner but through at least one anterior chamber, a kind of small combustion chamber attached inside the combustion chamber properly so-called, and having the function of producing a flame which is intended to ignite or re-ignite the jet or fuel supplied by the main injection system at the time of starting up or restarting the engine. The said anterior chamber may be made up of a protected enclosure supplied, on the one hand, with fuel coming from the auxiliary injection system and, on the other hand, with air metered through a calibrated orifice, said chamber being equipped with ignition means, such as a sparkplug or an incandescent plug or an electrical resistance. The design of the anterior chamber, its supply with air and fuel, and its means of ignition are specially calculated to facilitate to the maximum the ready ignition of the air/fuel mixture, with a view to giving the powerplant, more particularly in the case of a gas turbine jet propulsion engine, the greatest possible safety during start-up on the ground or during re-starting when in flight.

In such a plant, during the starting up or re-starting phase, a problem is nevertheless posed of adapting, to the flow-rate of air passing through the engine, the throughput of the fuel despatched both to the anterior chambers and to the combustion chamber proper.

In the present-day state of the art, it should be remarked on this subject that known regulatory devices make it possible to obtain satisfactory control of the plant only between the configurations "Slow" or "Idling" and "Full-out," but not at a lower rate than the "Slow" configuration, that is to say, in the course of starting up or re-starting the engine.

In the most existing regulators, the main fuel flow is, in fact, therefore refined by a system of stops (in respect of acceleration or of deceleration, according to the case in question) which generally prescribes a substantially constant value for the said throughput. Due to the fact that the flow-rate of air varies during this period over a considerable range, the richness of the air/fuel mixture itself changes considerably and the result may be, for example, incidents of overheating and the starting up of "surging."

Similarly, as regards the anterior chambers, the throughput supplied from the auxiliary injection system is generally constant during the entire phase of ignition or re-ignition and, furthermore, it is often the same, whether this be at ignition or upon re-ignition, whereas the flow-rate of air passing through the said anterior chambers is highly variable. The air/fuel mixture may therefore be excessively rich or, on the other hand, may be of inadequate richness, and the consequence may in both cases be a malfunction in light-up or the flaming-out of the said anterior chambers.

The invention has the aim of alleviating the drawbacks mentioned hereinbefore by bringing about, at any instant of time, both in the ignition phase and when re-igniting, the optimal adaptation of the throughput of fuel (supplied to the main and auxiliary injection systems) to the flow-rate of air passing through the plant.

With this aim in view, in a plant comprising a combustion chamber of the kind in which two different fuel-injection systems have port, i.e. a main injection system supplied through a main pipe by a main pump operating continuously, and an auxiliary injection system supplied, at the time of ignition and of re-ignition the chamber, by an auxiliary pump of the piston and cylinder type operating discontinuously and put into operation by the pressure of the fuel being fed to the main injection device, the invention provides a device for programming the throughput of fuel fed to the combustion chamber in the ignition or re-ignition phase, the said device comprising means to provide for the automatic adjustment of the throughput of fuel injected into the combustion chamber by the main injection system as a function of the relative positions of the piston and cylinder of the auxiliary pump.

In the case in which the plant is equipped with a re-cycling duct interconnecting the discharge side and the suction side of the main pump, the said adjusting means may to good advantage act on the cross sectional area of the said duct.

Thus, at any moment in the course of an ignition or re-ignition phase and independently of the possible action of a conventional adjusting device, merely a fraction of the flow of fuel fed from the main pump arrives at the main injection device. The remaining fraction is recycled to the suction side of the said pump in a proporton which depends upon the relative positions of the piston and of the cylinder of the auxiliary pump, i.e., in the case of a gas turbine jet propulsion engine, on the momentary value of the rotational speed of the engine between the start and the termination of the said process, in other words on the value of the flow-rate of air passing through the plant at the moment under consideration. It is thus possible to arrive at a programmed modulation or modification (operating as a function of the said flow-rate of air) of the throughput of fuel being supplied to the main injection system.

Apart from this, it will be noted that, due to the fact that the auxiliary injection pump is actuated by the pressure of the fuel being supplied to the main injection system, the pressure of the fuel supplying the auxiliary injection system is virtually equal to or proportional to the said pressure. The result of this is that for every variation in the throughput of fuel supplying the main injection system, there corresponds a correlative variation in the throughput of fuel being supplied to the auxiliary injection device, this being a variation which, especially in the case of anterior chambers, makes it possible to achieve optimal adaption in the richness of the air/fuel mixture.

According to one embodiment of the invention, the means which make it possible to adjust the cross sectional area of the recycling duct comprises a nozzle forming part of the said duct and cooperating with a specially configured obturating surface rigid with the piston of the auxiliary pump. The profile of the said surface may be fixed in advance, for example experimentally, so as to obtain the desired programmed modulation.

According to a preferred embodiment applicable in this case, the lateral wall or skirt of the piston of the auxiliary pump comprises two extreme parts axially spaced apart and in substantially fluid-tight contact with the inner wall of the cylinder of the said pump, and an intermediate portion comprised between the two extreme parts and located in a spaced position in relation to the said wall, this being in such a way as to define, along with the said wall, an annular enclosure which is substantially fluid-tight, which constitutes a part of the recycling duct, and into which the nozzle has port, the specially configured obturating surface which cooperates with the nozzle therefore being constituted by the said intermediate portion of the lateral wall of the piston.

For preference, the means for adjusting the cross-sectional area of the recycling duct is so conceived as completely to block the said duct when the piston and cylinder are occupying, in relation to each other, one or other of their two extreme positions. The recycling effect according to the invention is thus limited to the duration of the ignition or re-ignition phase.

According to one embodiment of the invention which is applicable to the case in whch the auxiliary-pump piston divides the cylinder of the said pump into two chambers, i.e. a first chamber which is in communication with the main pipe supplying the main injection system, and a second chamber containing the fuel for ignition, the second chamber communicates through a non-return valve with a source of fuel for ignition. The non-return valve just mentioned may therefore be positioned to good advantage in a passage which places the second chamber of the auxiliary pump in communication with the annular enclosure which constitutes a part of the recycling duct.

According to a further feature of the invention, the second chamber of the auxiliary pump is divided into two intercommunicating enclosures, one arranged in series in relation to the other, i.e. a first enclosure linked through the non-return valve with the source of light-up fuel, and a second enclosure linked with the auxiliary injection system, means rigid with the auxiliary-pump piston making it possible to interrupt communication between the two enclosures when the said piston is in either one of its two extreme positions. The fluid-tightness of the auxiliary injection pump relating to the combustion chamber is thus ensured during the periods other than those occupied by an ignition or re-ignition phase.

In the case in which the plant comprises a main regulator interposed in the main pipe between the main pump and the main injection system, the recycling duct preferably starts between the pump and the main regulator. This arrangement possesses the advantage that it makes it possible to operate the regulatory system according to the invention over a larger overall throughput and consequently to increase the relative precision of the said regulatory system.

As regards the tapping of pressure for actuating the auxiliary pump, said pressure is bled off downstream of the regulator and, generally speaking, downstream of any device, such as a drain or cut-off valve, which is the cause of losses of pressure, in order to achieve the situation indicated hereinbefore, in accordance with which the auxiliary injection pump is actuated by the fuel-supply pressure of the main injection system.

The following description of a preferred embodiment of the invention, which is given by way of example only, will bring out how the invention may be carried into practice, and refers to the accompanying drawings, in which.

Figure 1:
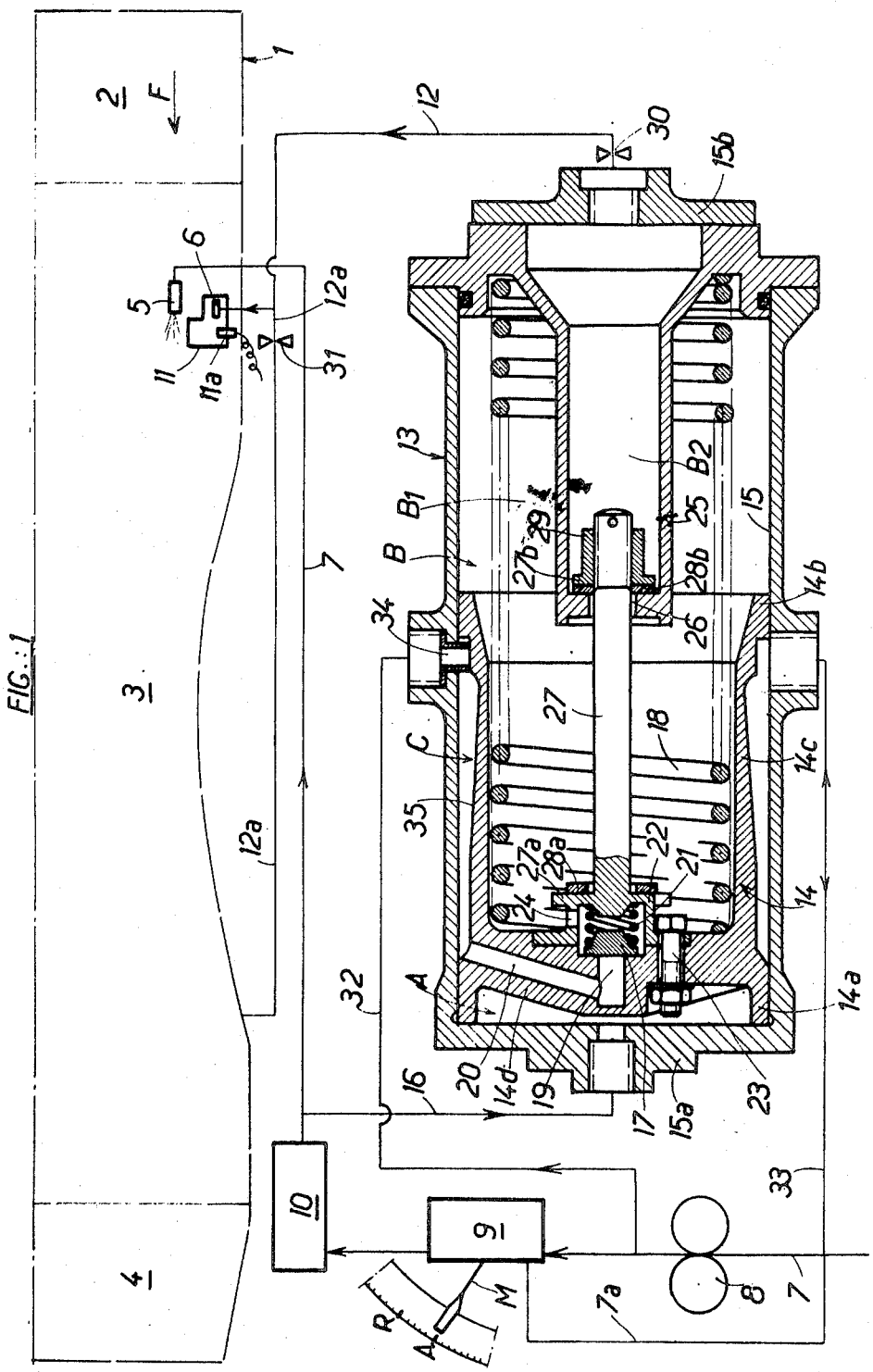
FIG. 1 is a diagrammatic view in longitudinal section of a preferred embodiment of a device in accordance with the invention for programming the throughput of fuel supplied to a combustion chamber during an ignition or re-ignition phase, the said device being shown in one of its extreme configurations, corresponding to the case in which the combustion chamber is unlit.
Figure 2:
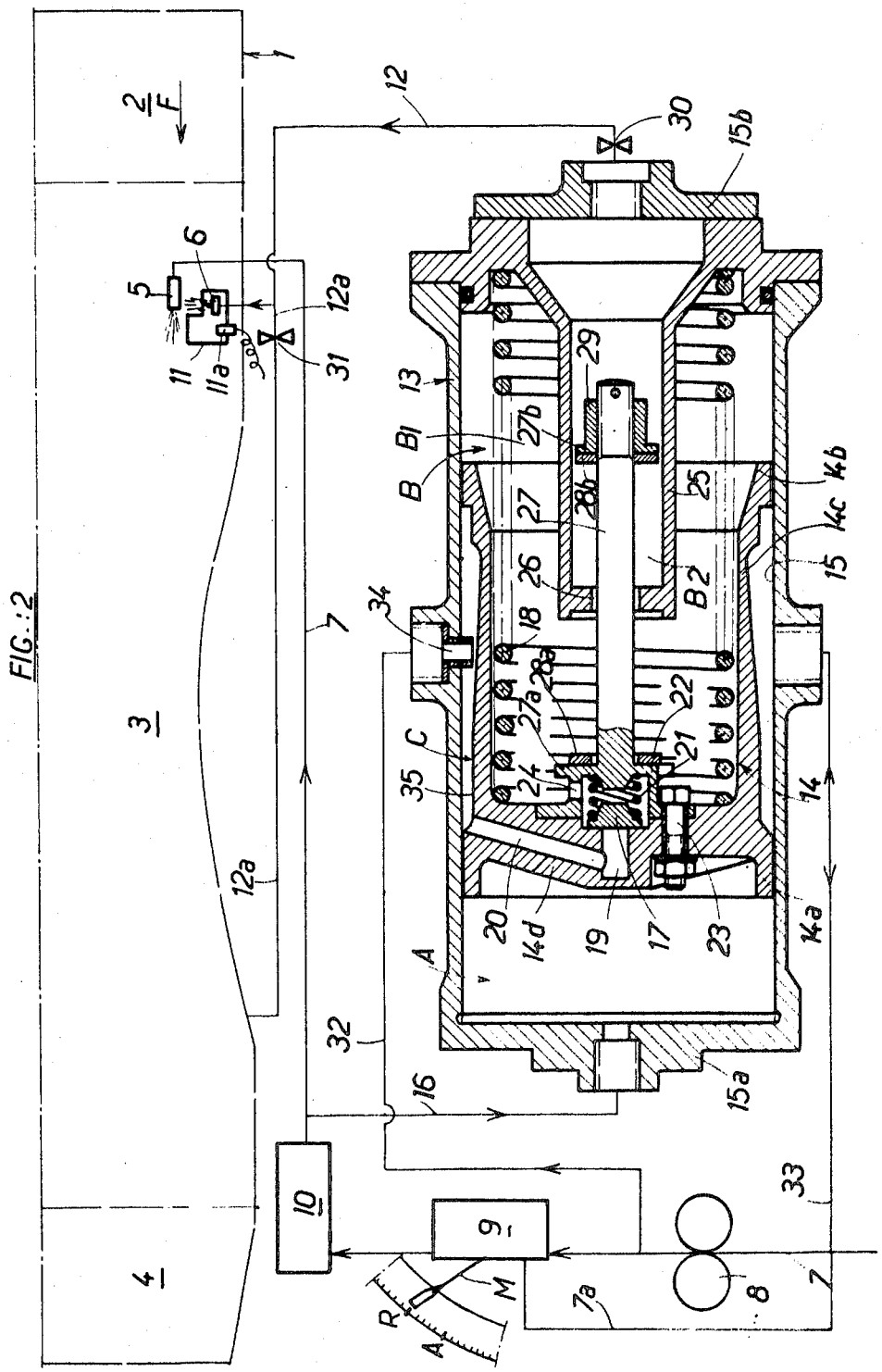
FIG. 2 is a view similar to that in FIG. 1, but in which the programming device is shown in one of its intermediate configuratons, that corresponding to the case in which the combustion chamber is in the process of being ignited or re-ignited.
Figure 3:
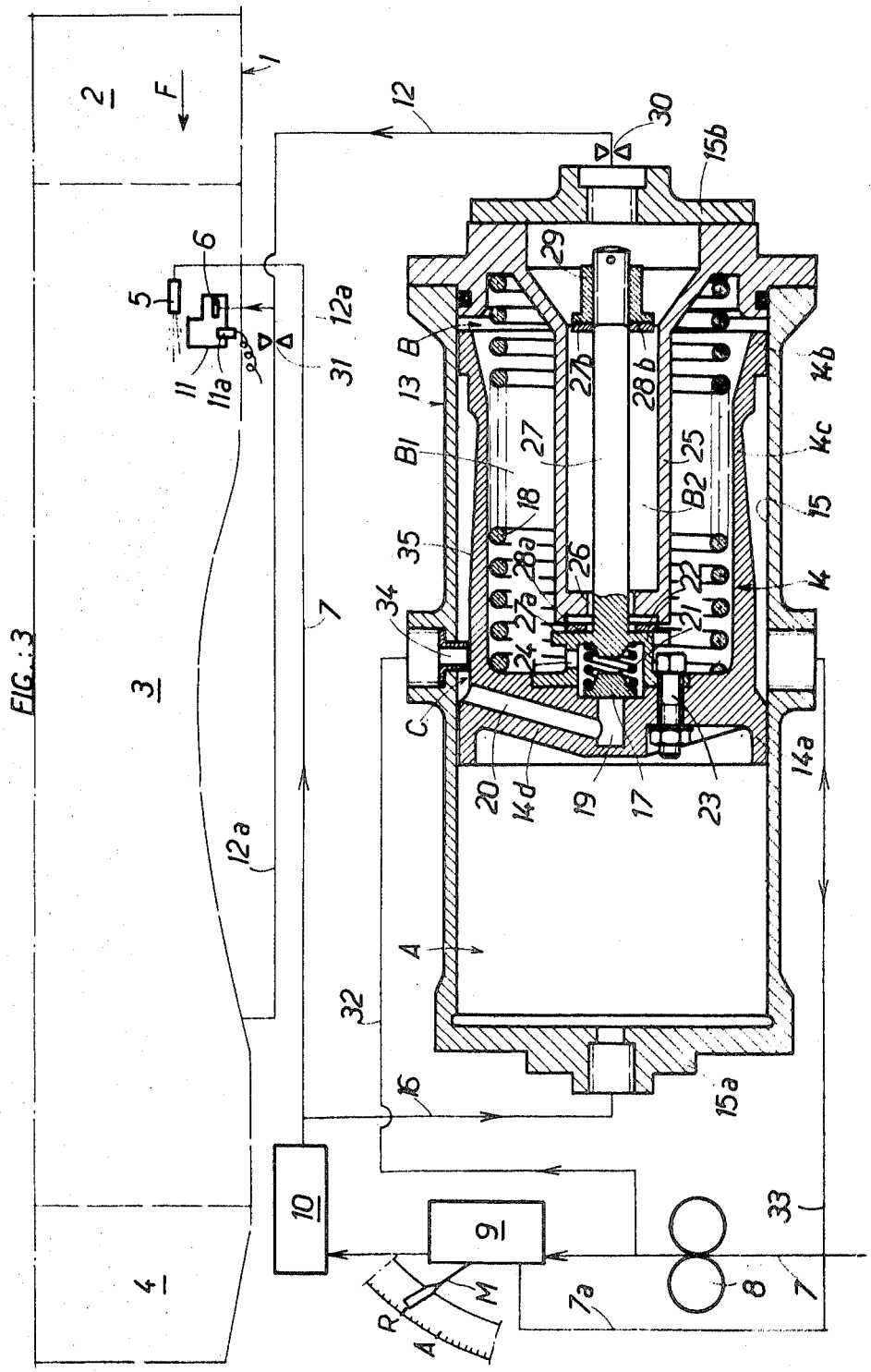

FIG. 3 is a view similar to FIGS. 1 and 2, but in which the programming device is shown in the vicinity of its other extreme configuration, which corresponds to the termination of the ignition or re-ignition of the chamber; and FIG. 4 is a diagram showing the evolution of the throughput of fuel injected during the ignition or re-ignition phase of the combustion chamber of a gas turbine jet propulsion engine, as a function of the rotational speed of the engine.

Referring to the drawings, the general reference number 1 designates a powerplant such as a gas turbine jet propulsion engine, provided with a programming device in accordance with the invention. The said powerplant, controlled by a lever M operated by the pilot, is traversed during operation by a current of air F of a variable flow-rate passing in succession through a compressor 2, a combustion chamber 3 and a turbine 4.

In the combustion chamber 3 two different fuel-injection systems have port, i.e. a main injection system 5 and an auxiliary injection system 6. The main injection system 5, which comprises one or more injectors or injection manifolds, is supplied with fuel through a main pipe 7 linked through a booster pump (not shown) with a tank (not shown). Along this main pipe are interposed a downstream of the booster pump, a continuously operating main pump 8, for example a gear pump, a main regulator 9 and a blow-off device 10. With the regulator 9 is associated a lever M controlled by the pilot and capable of assuming several positions, more especially a "STOP" position (A) and a "SLOW" position (B). An auxiliary duct 7a, tapped on to the regulator 9, renders it possible, by recycling a fraction of the throughput of fuel supplied by the pump 8, to limit to a desired value the effective throughput to the main injection system 5. When the lever M is in the "STOP" position, the entirety of the throughput of fuel supplied by the pump 8 is recycled through the auxiliary duct 7a. As to the auxiliary injection system 6, it is adjusted so as to discharge a spray of fuel into at least one shielded enclosure or interior chamber 11 during the start-up or re-starting of the engine, the chamber 11 being mounted in a conventional manner in the combustion chamber 3 and being provided with electrical ignition means, such as a plug 11a. The auxiliary injection system 6 is connected through a pipe 12 to a pump 13 operating discontinuously and of the type having a piston 14 and a cylinder 15, the pump being operated by the pressure of the fuel supplied to the main injection system 5. The two ends of the cylinder have been designated by the reference numbers 15a and 15b.

The piston 14 divides the cylinder 15 into two chambers, i.e. a first chamber A which is subjected to the said pressure, and a second chamber B which contains the fuel for ignition. The chamber A is connected to the main pipe 7 through a duct 16 tapped from a point on the said pipe 7 which is located downstream of the regulator 9 and of the blow-off device 10 and, in general terms, downstream of any apparatus through which an appreciable loss of pressure might arise, so that the pressure prevailing in the said chamber is always equal to that of the fuel being supplied to the main injection system. The chamber B communicates with a source of fuel for ignition through a non-return valve 17 which will be referred to again later. In the absence of a countering force, the piston 14 is urged to a stop near one of its terminal positions (to the left in the drawings) by a spring 18.

The piston 14 has a lateral wall or skirt which extends over a substantial axial length and comprises two end parts 14a, 14b spaced apart axially and in substantially fluid-tight contact with the inner wall of cylinder 15, and an intermediate portion 14c lying between the two terminal parts and located in a spaced position in relation to the said wall, in such a way as to define, along with the said wall, an annular enclosure C which is substantially fluid-tight.

At one of its ends, the piston 14 has a front wall 14d pierced by a blind bore 19 which communicates, through a transverse passage 20, with the annular enclosure C. The said bore extends substantially axially, and its outlet is blocked by the non-return valve 17 mentioned hereinbefore. The latter is urged into its closed position by a spring 21 which rests against a cap 22 secured by means of bolts 23 to the front wall 14d of the piston 14. A passage 24, provided through the lateral wall of the cap 22, makes it possible, when the valve 17 is in the open position, to place the annular enclosure C in communication with the chamber B by way of the transverse passage 20 and the bore 19.

The chamber B is divided into two enclosures $B_1$ and $B_2$ by an intermediate part 25 mounted between the wall 15 and the end 15b of the cylinder, and rigid with the said end. The first enclosure $B_1$ is connected with the annular enclosure C through the valve 17, while the second enclosure $B_2$ communicates by way of the pipe 12 with the auxiliary injection system 6. The two enclosures $B_1$ and $B_2$ are interconnected in series by a bore 26 drilled through the wall 25, through which bore a rod 27, with a cross-section smaller than that of the said bore is slidable. The rod may consist, for example, of an axial extension of the cap 22, and it is consequently rigid with the piston 14. Its useful length is virtually equal to that of the piston stroke, and it possesses, at each of its ends, a fixed shoulder 27a or an adjustable seating 27b which acts as a support for an annular sealing means 28a or 28b. The adjustable shoulder 27b may be constituted, for example, by a flange appertaining to a bushing 29 screwed in place at the free end of the rod. The arrangement of these various parts is such that communication between the two enclosures $B_1$ and $B_2$ is secured through the bore 26 (FIG. 2), except when the piston occupies one position (see FIG. 1) or the other position (see FIG. 3) of its two extreme positions.

The main pipe 12, which constitutes the discharge pipe from the auxiliary pump 13, may include a restriction or diaphragm 30. Conventionally, the said pipe may also possess a bypass 12a which communicates, through a further restriction or diaphragm 31, with the interior of the combustion chamber 3. This arrangement makes it possible to carry out, outside of the times for the ignition or re-ignition phases of the chamber, a scouring action on the supply-pipe of the auxiliary injection system, in order to prevent phenomena involving the coking-up of the fuel contained in the said pipe.

In accordance with the invention, a programming device makes it possible precisely to adjust the throughput of fuel injected, during the start-up or re-starting phase of the engine, into the combustion chamber 3 and the anterior chamber 11. The said device comprises a recycling duct interconnecting the discharge side and the suction side of the main pump, and means which automatically adjust the cross-sectional area of the said duct as a function of the relative positions of the piston 14 and the cylinder 15. To this end, the recycling duct comprises two pipes 32, 33, one of them inserted into the discharge side of the main pump, upstream of the regulator 9, and the other inserted into the suction side of the said pump, each of them having port, through the wall of cylinder 15, in the annular enclosure C, which thus constitutes a part of the said duct. At its outlet into the annular enclosure C, the pipe 32 takes the form of a nozzle 34 whose free terminal section is located opposite to and in the immediate vicinity of the intermediate portion 14c of the skirt of piston 14. The said skirt, the configuration of which is designated by the reference numeral 35, thus blocks the nozzle 34 (and consequently the recycling duct) to an extent which depends on the position of piston 14 and on the shape given to the configured portion 35. As FIGS. 1 and 3 demonstrate, this shape is fixed in such a way that the recycling duct will be completely blocked when the piston 14 and the cylinder 15 occupy, in relation to each other, one or other of their two extreme positions.

A study will now be made of the operation of the programming device in accordance with the invention, considering first the case in which, with the lever M located in the "STOP" position (A) and the entirety of the throughput of fuel from the main pump 8 being then recycled to the suction side of the said pump through the auxiliary duct 7a, the combustion chamber is unlit.

The pressure of fuel in the chamber A is at this time insufficient to oppose the action of the spring 18 and of the pressure in the chamber B, so that the piston 14 comes to a stop in that of its two extreme positions shown in FIG. 1. In this position, the nozzle 34 is blocked, as is the non-return valve 17. The enclosures $B_1$ and $B_2$ are isolated from each other by the sealing means 28b.

Upon the start-up or re-starting of the engine, the lever M is moved from the "STOP" position (A) to the "SLOW" position (R). The main pump 8 then starts to fill the injectors or injection manifolds of the main injection system 5 through the main pipe 7. At the end of the filling process, the fuel pressure rises abruptly in the main pipe 7 and, being transferred into the chamber A through the duct 16, has the effect of initiating a movement to the right (in the drawings) of the piston 14. The sealing means 28b carried by the rod 27 then lifts away from the bore 26 so that the fuel for ignition contained in the chamber B starts to be impelled through the diaphragm 30 and the pipe 12 towards the auxiliary injection system 6 which has port in the anterior chamber or chambers 11.

The programmming device is then in the configuration shown in FIG. 2. The piston 14, having shifted to the right, uncovers the nozzle 34, so that a part of the fuel discharged by the main pump 8 is recycled towards the suction side of the said pump through the pipe 32, the nozzle 34, the annular enclosure C and the pipe 33. The throughput of recycled fuel is modified as a function of the distance which separates the free terminal section of the nozzle 34 and the configured portion 35 of the intermediate portion 14c of the skirt of piston 14, i.e. as a function of the position of the said piston. The shape of this configured part is predetermined, for example experimentally, so that the throughput of fuel reaching the main injection system (a throughput equal to the overall throughput at the discharge side of the pump 8 minus the recycled throughput) evolves in accordance with an appropriate law in the course of an ignition or re-ignition phases of the combustion chamber 3, instead of remaining virtually constant, as would be the case if it were determined by conventional stop means for limiting the flow-rate.

Similarly, the throughput supplied to the injectors of the auxiliary injection system 6, instead of remaining virtually constant during the entire duration of an ignition or re-ignition phase, as is the case with engines which include a conventional injection pump, is modified in correlation with the throughput supplying the main injection system.

If Q designates the throughput of fuel being supplied to the main injection system, $Q_1$ the throughput of fuel for ignition, S the characteristic cross-sectional area of the main injection system, $S_1$ the characteristic cross-sectional area of the auxiliary injection system, P the feed-in pressure of the main injection system, $P_1$ the injection pressure of the fuel for light-up, and $k$ and $k_1$ are two constants, it is in fact admissible to write:

$$Q = kS\sqrt{P} \text{ and } Q_1 = k_1 S_1 \sqrt{P_1}$$

If the very weak force of the return spring 18 is disregarded, the pressures P and $P_1$ may be regarded as virtually equal or proportional. It is then admissible to write:

$$P_1 = k_2 P \text{ and } Q_1 = k_1 S_1 \sqrt{k_2} \sqrt{P} = k_3 S_1 \sqrt{P}$$

$k_2$ and $k_3$ being two further constants. Hence:

$$\frac{Q}{Q_1} = \frac{kS}{k_3 S_1} = k_4$$

$k_4$ likewise being a constant.

The throughput Q being modified by virtue of the variable recycling device described, the result is that the throughput $Q_1$ is in a constant ratio thereto. By a suitable arrangement of the profile of the configured portion 35 it is consequently possible to arrange that the said throughputs of fuel should remain constantly adapted to the flow-rates of air traversing the combustion chamber 3 and the anterior chamber 11 respectively, these being flow-rates which are inter se also in a constant ratio, so as to secure, in the said chamber and anterior chamber, optimal richness during the entire duration of the ignition or re-ignition phase.

If the flow-rates of air under consideration are designated D and $D_1$, the resulting degrees of richness are designated R and $R_1$, and if two new constants are designated $k_5$ and $k_6$, then it is admissible to write:

$$D_1 = k_5 D, \text{ and } R = \frac{kS\sqrt{P}}{D}, R_1 = \frac{k_1 S_1 \sqrt{P_1}}{D_1} = \frac{k_3 S_1 \sqrt{P}}{k_5 D}$$

hence:

$$\frac{R}{R_1} = \frac{kk_5 S}{k_3 S_1} = k_6 = c^{te}$$

The two degrees of richness are therefore in a constant ratio. To facilitate ignition, it would be possible to good advantage to prescribe for the anterior chamber 11 a richness $R_1$ greater than that envisaged for the combustion chamber 3, but which would nevertheless remain proportional to it. For this it will be sufficient to make $k_6 < 1$.

During the entire duration of the displacement of piston 14, the pressure of the light-up fuel in the chamber B is sufficient to set the non-return valve 17 firmly on its seat, this preventing any communication between the said chamber and the annular enclosure C.

At the termination of an ignition or re-ignition phase, the piston 14 arrives at a stop in its second extreme position (to the right in FIG. 3). The injection of fuel through the auxiliary fuel system 6 is then ended, and the enclosures $B_1$ and $B_2$ are once more isolated from each other, but this time by means of the sealing means 28a. The nozzle 34 is then again completely blocked by the configured portion 35, so that the return flow through the recycling duct 32, 34, C, 33 is interrupted. With the ignition or re-ignition of the chamber 3 achieved, the regulating of the fuel throughput is entirely taken over from this moment in time by the main regulator 9. During the entire time the powerplant is running, the piston 14 remains at its stop on the right-hand side, in the position described above.

When the lever M is returned to its "STOP" position, the pressure in the chamber A drops abruptly, so that under the action of the spring 18 the piston 14 returns to the left, into the position in FIG. 1, passing through the momentary position shown in FIG. 2. The shifting of the piston brings about a condition of underpressure in chamber B. Under the effect of this underpressure, fuel is delivered through the annular enclosure C, the transverse passage 20, the bore 19, the valve 17 in the open position and the passage 24, and again fills the two enclosures $B_1$ and $B_2$ of the chamber B.

With the piston 14 once again back at its relevant stop towards the left-hand side (FIG. 1), the valve 17 and the nozzle 34 are again blocked. The enclosures $B_1$, $B_2$ and C, full of fuel, are therefore once more isolated from each other. The programming device is consequently ready for a fresh ignition or re-ignition procedure.

FIG. 4 is a diagram representing start-up. In this diagram have been entered, along the Y-axis, the throughputs Q of main fuel and the throughputs $Q_1$ of light-up fuel, and along the X-axis the shifting of the piston or, something which amounts virtually to the same thing in the case of a gas-turbine engine, the rotational speed N of the engine.

The point O corresponds to the instant at which the lever M, previously in the "STOP" position, is transferred to the "SLOW" position, so that the main pump 8 starts to send a discharge along the main pipe 7 in the direction of the main injection system 5. The point $N_1$ corresponds to the termination of the filling of the main injection system 5 and to the start of the injection of the main fuel and of the light-up fuel. At that instant there occurs an abrupt decrease in the throughput coefficient through the injectors or manifolds of the main injection system 5, a decrease which is designated on the diagram showing the throughput of main fuel, by a sawtooth mark.

The point $N_2$ corresponds to the termination of the injection of ignition fuel into the anterior chamber 11, and the point $N_3$ to the termination of the process of establishing the "SLOW" rate.

Between $N_1$ and $N_2$ the throughput Q is modified as a function of the shifting of the piston 14 according to a programme prescribed in advance by the appropriate selection of the form of the configured portion 35. The throughput $Q_1$, which is, as has been stated, a function of the throughput Q, is consequently itself modified in a similar manner.

The programming device according to the invention thus plays a dual role during an ignition or re-ignition phase:

that of a main regulator adjusting the throughput of fuel Q as a function of the rotational speed N;

and that of a regulator for fuel feed to the anterior chambers 11, this regulator prescribing the start of the injection, the curve of the throughput $Q_1$ as a function of the rotational speed N, and the termination of the injection.

It therefore makes it possible to effect, in the course of the said phase a continuous re-adjustment of the richness of the air/fuel mixture both in the combustion chamber 3 and in the anterior chambers 11, and consequently to create ideal conditions for ready ignition in the said anterior chambers and for correct combustion in the said chamber.

The actuation of the device is effected simply by shifting the pilot's lever from the "STOP" position to the "SLOW" position. The halting of injection into the anterior chambers and the cessation of modification to the throughput of main fuel are brought about automatically by the piston 14 attaining the end of its stroke. There is therefore no occasion to make use of electrovalves or similar devices to bring the proper sequences into effect.

Fluid-tightness upon stopping the engine is ensured by the application of sealing means 28b, forming a valve, against the bore 26, under the action of the spring 18, which simultaneously functions as a return spring for filling the enclosures $B_1$, $B_2$, and as a valve spring.

Finally, through the simplicity of its constituent parts (such as a cylinder, a piston, a spring and a recycling duct), the programming device according to the invention has those qualities of robustness and reliability that are especially necessary when the point at issue is the ensuring of the correct operation and safety of a powerplant such as a gas turbine jet propulsion engine.

It is apparent that the embodiment described is only an example and that various modifications are possible within the scope of the invention, as defined by the appended claims.

I claim:

1. A device for programming the throughput of fuel supplied to a combustion chamber during an ignition or re-ignition phase, the said chamber being of the type in which at least two different fuel-injection systems have port i.e. a main injection system supplied through a main pipe by a continuously operating main pump, and at least one auxiliary injection system supplied at the time of ignition or re-ignition of the chamber by an auxiliary pump of the piston and cylinder type operating discontinuously and put into operation by the pressure of the fuel being fed to the main injection system, the said device comprising means to provide automatic adjustment of the throughput of fuel injected into the combustion chamber by the main injection system as a function of the relative positions of the piston and cylinder of the auxiliary pump.

2. A device according to claim 1, including a recycling duct interconnecting the discharge side and the suction side of the main pump, the said adjusting means comprising means to adjust the cross sectional area of the said recycling duct.

3. A device according to claim 2, wherein the means for adjusting the cross sectional area of the recycling duct comprises a nozzle forming part of the said duct and co-operating with a specially configured obturating surface rigid with the piston of the auxiliary pump.

4. A device according to claim 3, wherein the lateral wall of the piston of the auxiliary pump comprises two extreme parts spaced apart axially and in substantially fluid-tight contact with the inner wall of the cylinder of the said pump, and an intermediate portion between the two extreme parts and located in a spaced position in relation to the said wall so as to define with the said wall an annular enclosure which is substantially fluid-tight and which constitutes a part of the recycling duct, and into which the said nozzle has port, the specially configured obturating surface co-operating with the nozzle being constituted by the said intermediate portion of the lateral wall of the piston.

5. A device according to claim 2, wherein the means for adjusting the cross sectional area of the recycling duct completely blocks the said cross sectional area when the piston and the cylinder are occupying, in relation to each other, one or other of their two extreme positions.

6. A device according to claim 1, in which the piston of the auxiliary pump divides the cylinder of the said pump into two chambers, i.e. a first chamber which is in communication with the main pipe supplying the main injection system, and a second chamber communicating through a non-return valve with a source of fuel for ignition.

7. A device according to claim 6, in which the non-return valve is positioned in a passage which places the second chamber of the auxiliary pump in communication with the annular enclosure which constitutes a part of the recycling duct.

8. A device according to claim 6, wherein the second chamber of the auxiliary pump is divided into two intercommunicating enclosures, one arranged in series in relation to the other, i.e. a first chamber connected through the non-return valve with the source of ignition fuel, and a second enclosure connected with the auxiliary injection system, and wherein means rigid with the piston of the auxiliary pump make it possible to interrupt communication between the two enclosures when the said piston is in either one of its two extreme positions.

9. A device according to claim 2, including a main regulator interposed in the main pipe between the main pump and the main injection system, wherein the recycling duct is tapped off between the said pump and the said regulator.

10. A device according to claim 1, including, interposed in the main pipe between the main pump and the main injection system, an apparatus such as a regulator or a blow-off device which is the cause of losses of pressure, wherein the pressure of the fuel actuating the auxiliary pump is bled off downstream of the said apparatus.

References Cited

UNITED STATES PATENTS

| | | | |
|---|---|---|---|
| 3,105,356 | 10/1963 | Hamilton | 60—39.14 X |
| 3,106,934 | 10/1963 | Rogers | 137—117 |
| 3,318,091 | 5/1967 | Bader | 60—39.82 |
| 3,465,778 | 9/1969 | Kast | 137—117 |

CLARENCE R. GORDON, Primary Examiner

U.S. Cl. X.R.

60—39.06, 39.14, 39.81; 137—116, 117